April 26, 1927.

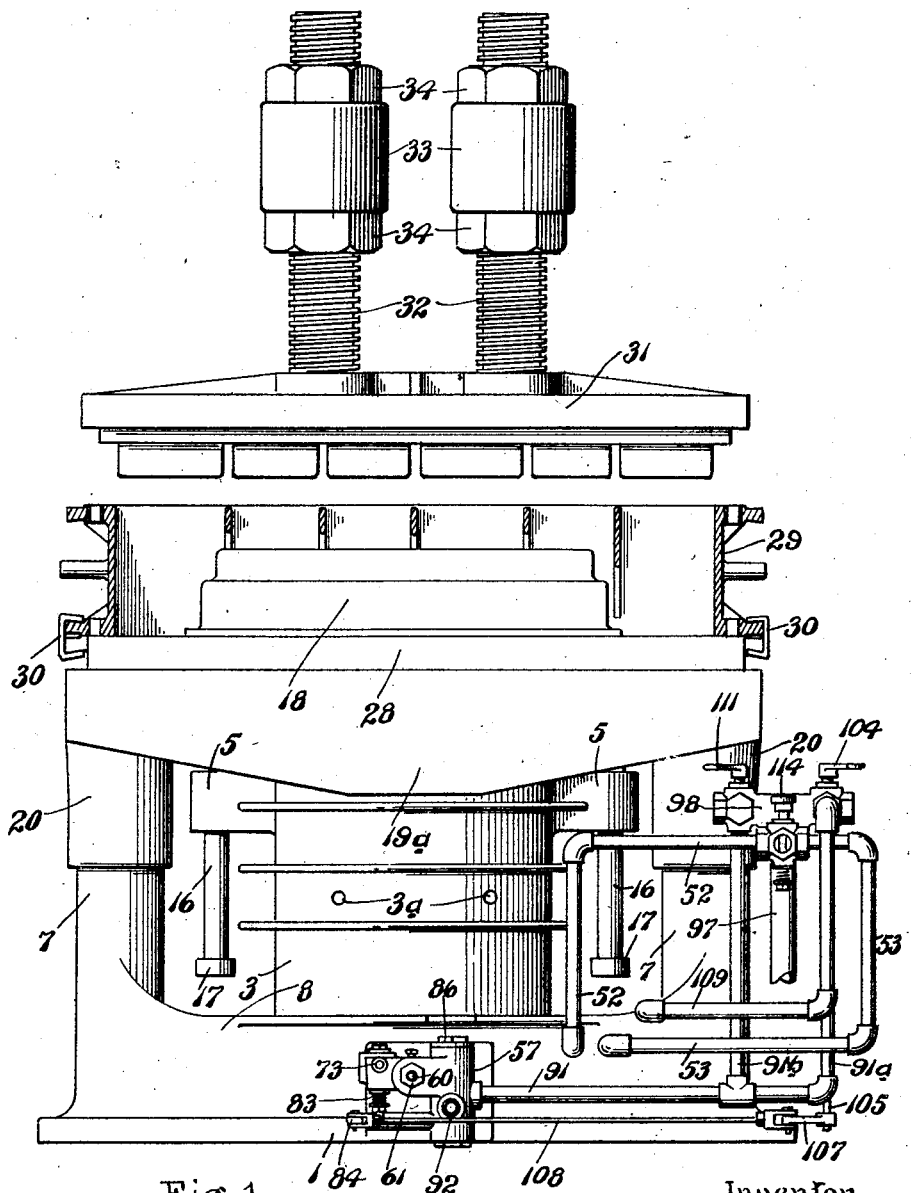

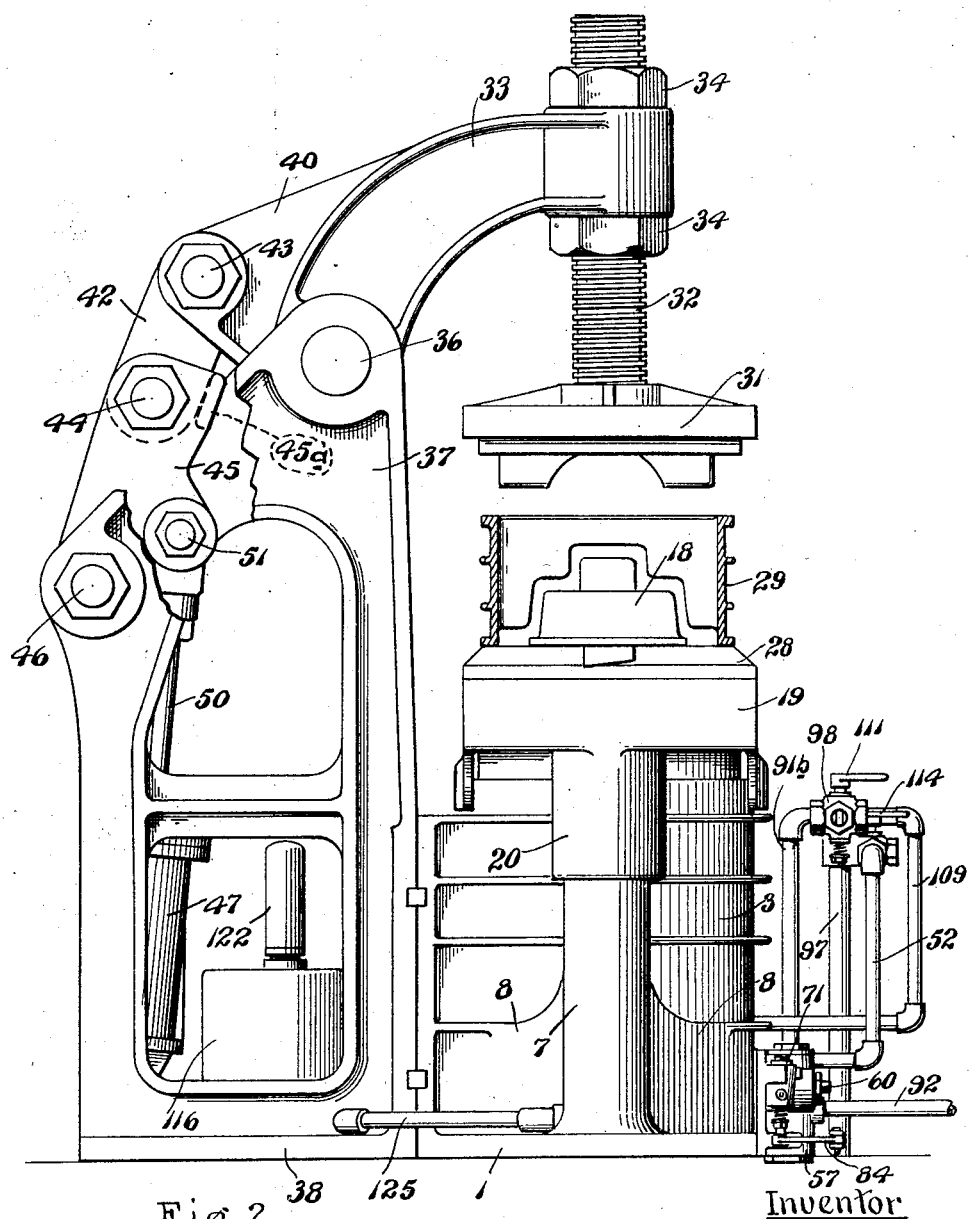

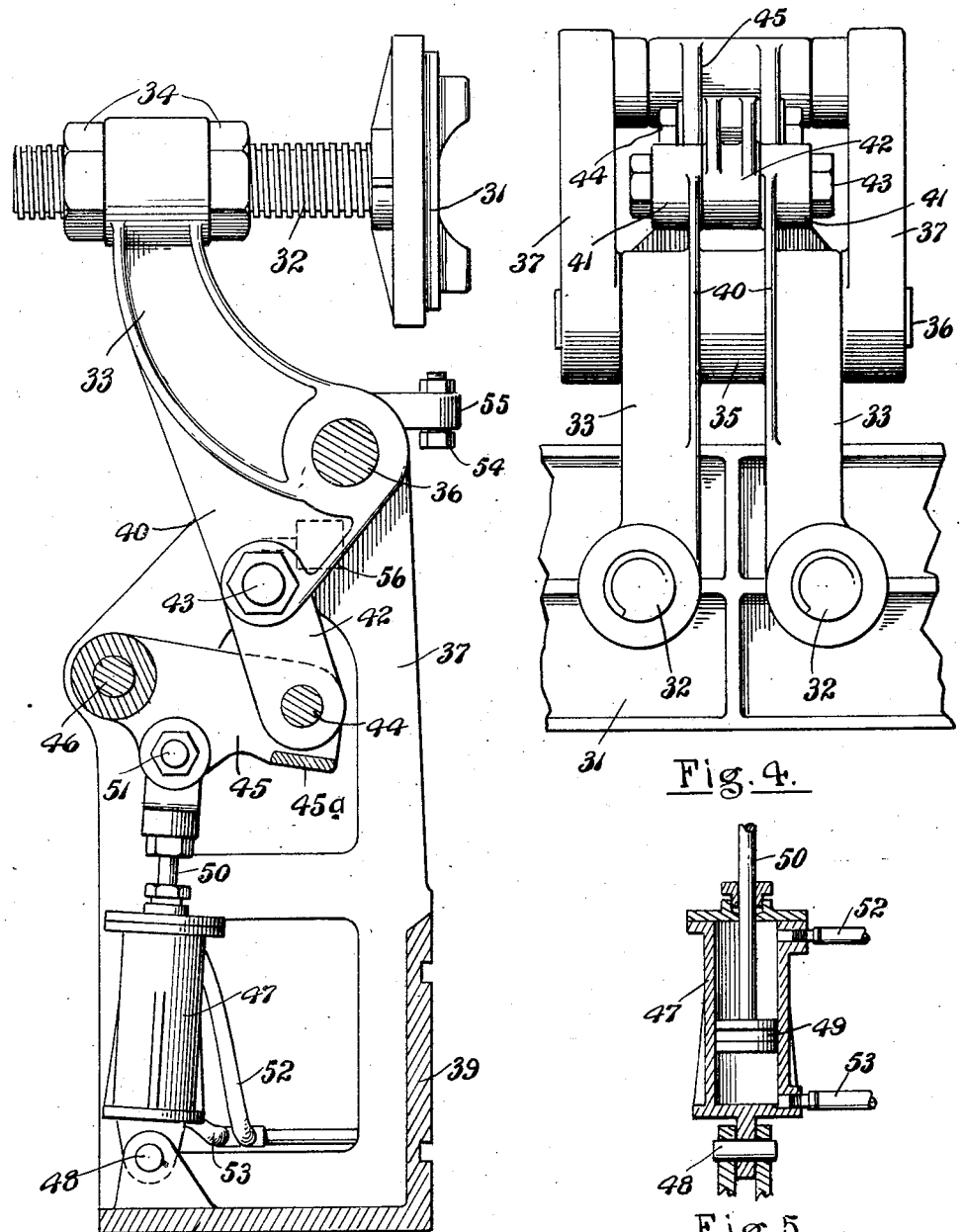

D. J. CAMPBELL 1,626,225

MOLDING APPARATUS

Filed July 20, 1925     13 Sheets-Sheet 4

Inventor
Donald J. Campbell
By Frank E. Liverance, Jr.
Attorney.

April 26, 1927.

D. J. CAMPBELL

MOLDING APPARATUS

Filed July 20, 1925

Inventor
Donald J. Campbell
By Frank E. Liverance Jr.
Attorney.

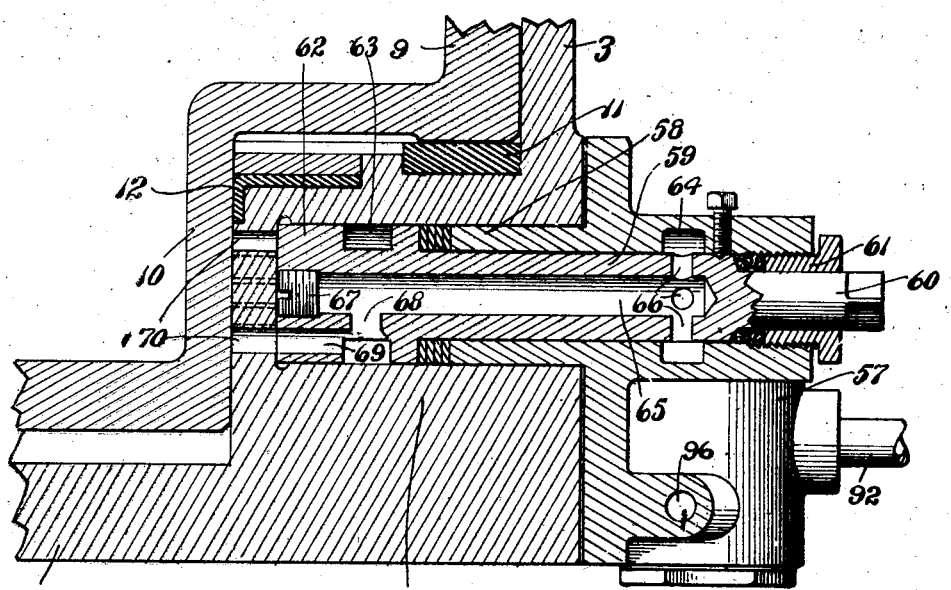
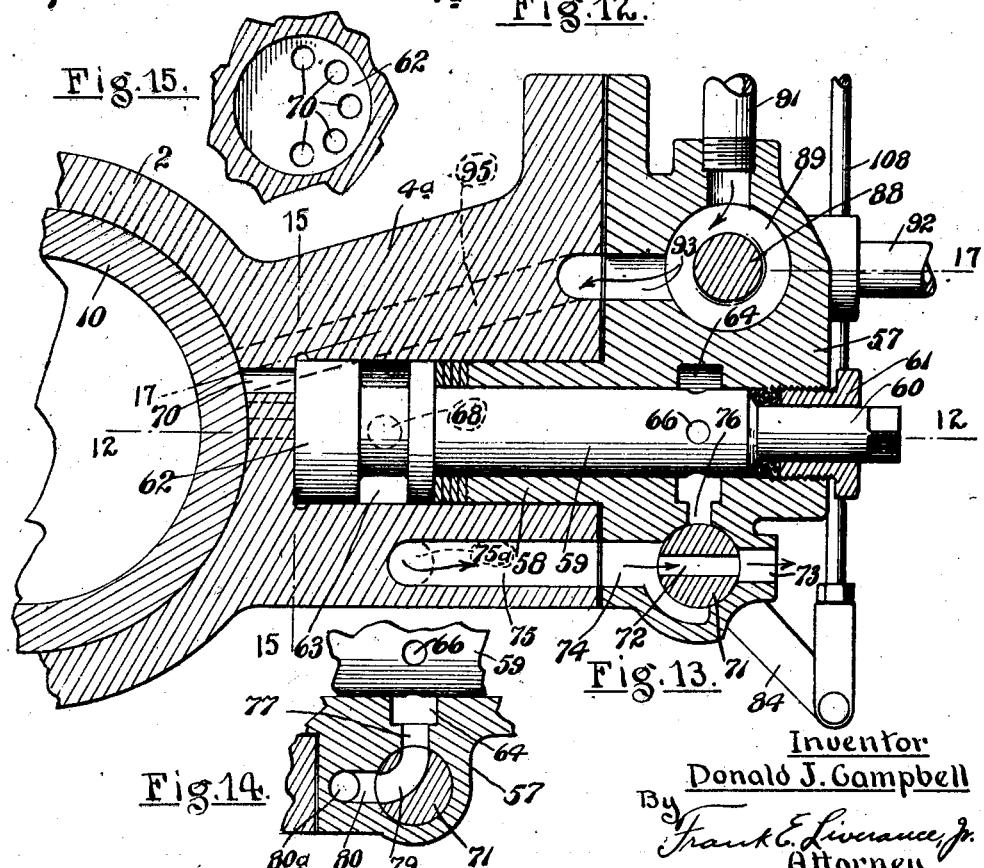

April 26, 1927.
D. J. CAMPBELL
MOLDING APPARATUS
Filed July 20, 1925   13 Sheets-Sheet 11

1,626,225

Inventor
Donald J. Campbell
By Frank E. Liverance Jr.
Attorney.

Inventor
Donald J. Campbell
By Frank E. Liverance Jr.
Attorney.

Patented Apr. 26, 1927.

1,626,225

UNITED STATES PATENT OFFICE.

DONALD J. CAMPBELL, OF MUSKEGON, MICHIGAN.

MOLDING APPARATUS.

Application filed July 20, 1925. Serial No. 44,733.

This invention relates to molding apparatus. It is a primary object and purpose of the present invention to provide a molding apparatus wherein the sand in a flask around and over a pattern may be jolted so as to condense the sand in the mold to a desired density, particularly in the lower portions of the flask, after which the sand within the flask may be subjected to a squeezing operation to properly condense the sand in the upper portions of the flask, followed by an elevation of the flask with the mold therein while the pattern remains in lower position thus drawing mold from the pattern, all of these operations to be performed through pneumatic agencies readily controlled by a single operator through the mere turning of valves which direct and control the passage of compressed air to the mechanisms at the proper places for effecting the various jolting, squeezing and pattern drawing operations. The invention is capable of many embodiments one of which is fully set forth in detail in the accompanying drawings, showing a construction by means of which the operations stated are effected in a practical and efficent manner, as will apear as understanding of the invention is had from the following description taken in connection with said drawings, in which, Fig. 1 is a front elevation of a molding apparatus made in accordance with my invention.

Fig. 2 is a side elevation thereof, some parts being broken away and others shown in section for a better disclosure of the construction.

Fig. 3 is a vertical section taken through the squeezing head and the mechanism for operating the same.

Fig. 4 is a fragmentary plan view of the construction shown in Fig. 3 with the squeezing head in operative position.

Fig. 5 is a vertical section through the air cylinder used to operate said squeezing head.

Fig. 12 is a fragmentary enlarged vertical section substantially on the line 12—12 of Fig. 13.

Fig. 13 is a fragmentary enlarged horizontal section through the automatic air control mechanism used in performing the jolting operation.

Fig. 14 is a fragmentary horizontal section taken through one of the valves shown in Fig. 13 but at a lower plane.

Fig. 15 is a fragmentary vertical section on the plane of line 15—15 of Fig. 13.

Like reference characters refer to like parts in the different figures of the drawings.

Figure 7:
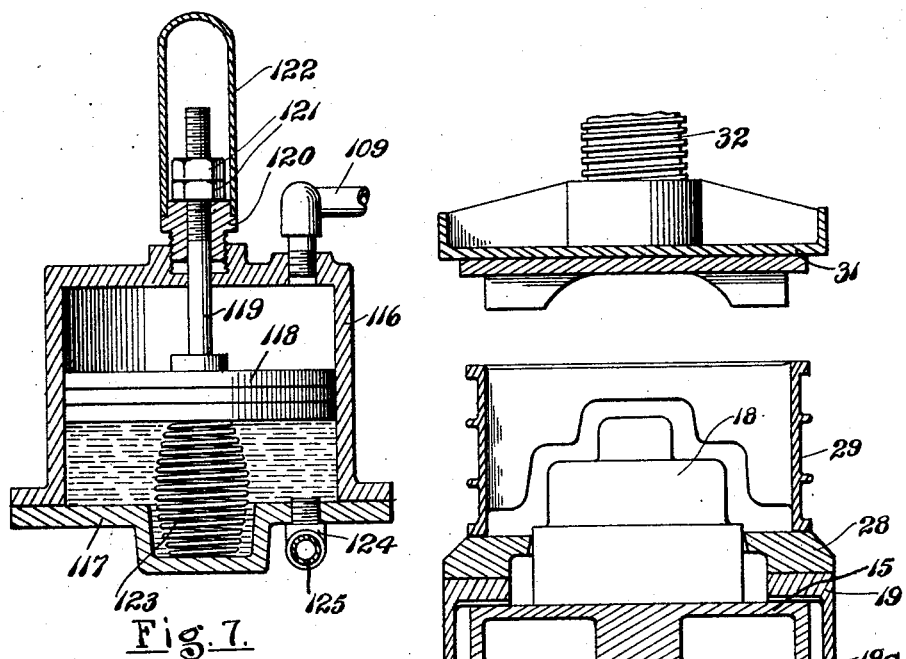
Fig. 7 is a fragmentary enlarged view of a portion of the apparatus relating to the pattern drawing, and showing the same as it appears during such operation of pattern drawing.
Figure 6:
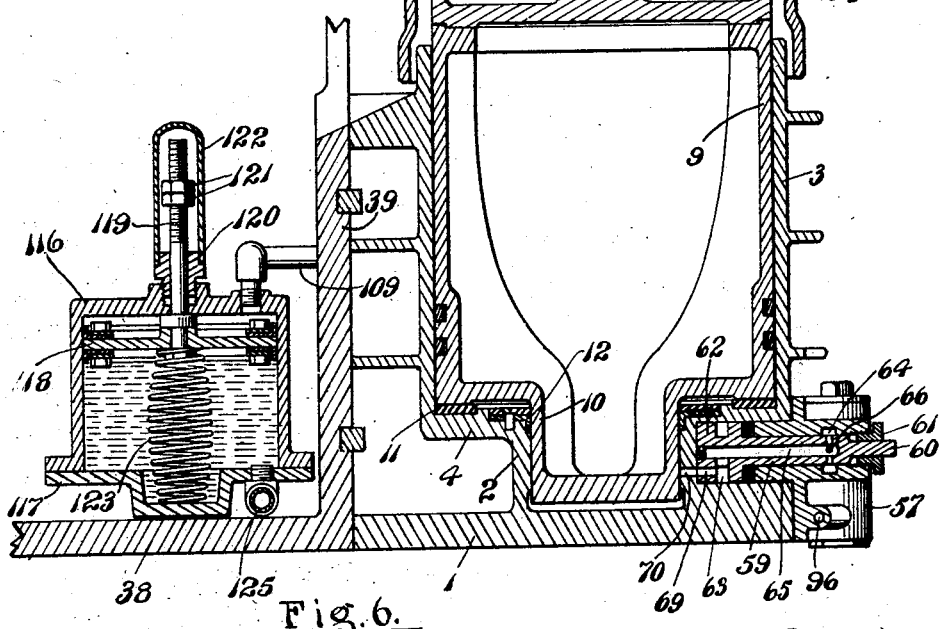
Fig. 6 is a fragmentary vertical section taken through the molding apparatus from front to rear.
Figure 8:
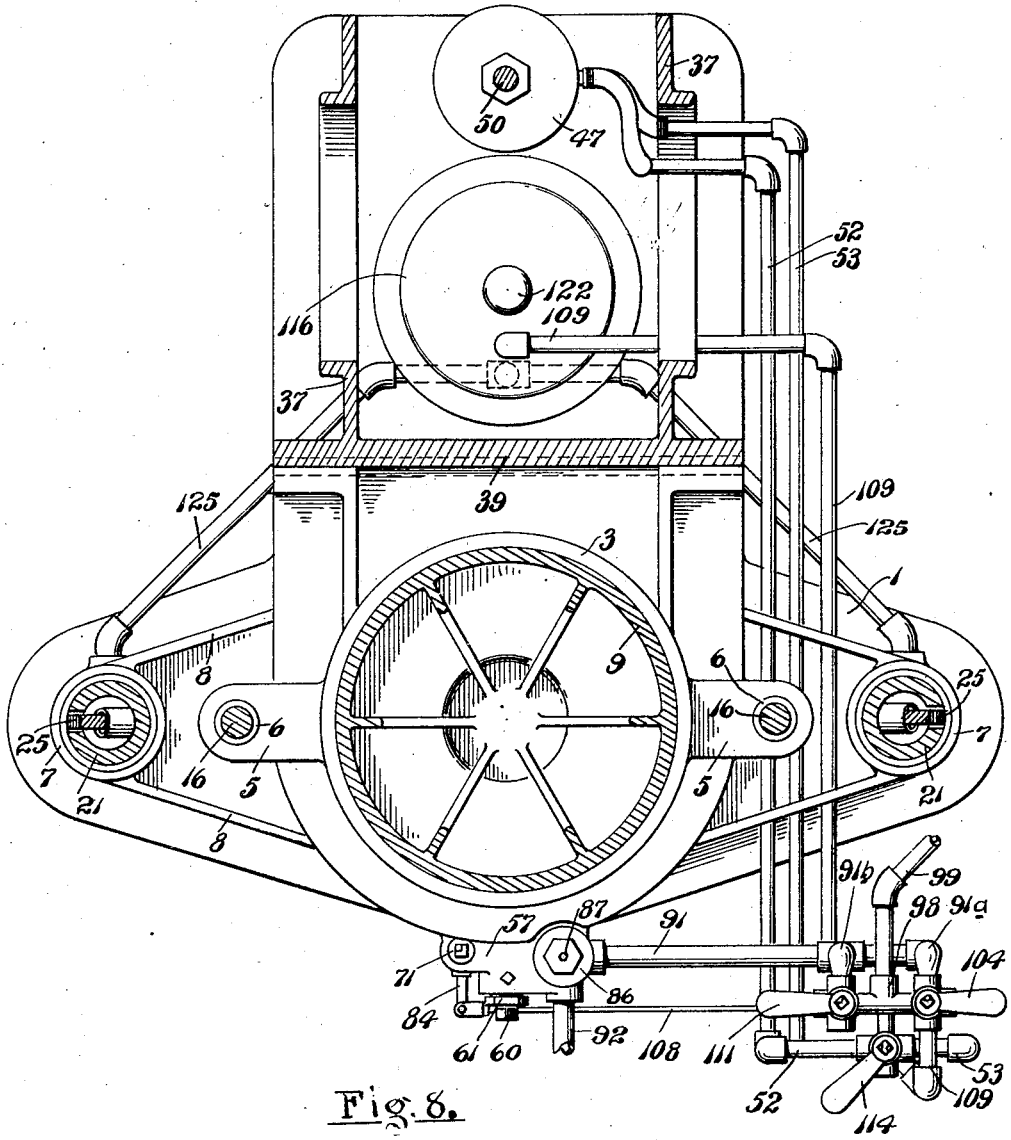
Fig. 8 is a horizontal section through the molding apparatus.

In the construction of the apparatus a base 1 is provided formed from cast metal from which a short vertical cylinder 2 extends upwardly which is then enlarged in diameter to make the larger cylinder 3, there being a horizontal connecting bottom 4 between the lower end of the cylinder 3 and the upper end of the cylinder 2. These cylinders with the bottom 4 are cast integral with the base 1. At diametrically opposed points near the upper end of the cylinder 3 lugs 5 extend outwardly, each of which has a vertical opening therethrough receiving a bushing 6 as shown. At each end of the base 1 other cylinders 7 are cast and extend vertically and between the cylinders 7, 2 and 3 reinforcing ribs 8, integrally cast therewith, are interposed.

Within the cylinder 3 a piston or ram 9 is mounted, being equipped with suitable packing rings near its lower end, from which a smaller piston 10 extends downwardly adapted to be received within the smaller cylinder 2. An annular ring 11 of hardened material is carried on the bottom 4 of the larger cylinder against which the lower end of the piston 9 may strike in its downward movement; and around the smaller piston 10 near the upper end of the cylinder 2 a suitable packing 12 is secured in place to guard against the escape of compressed air.

Figure 9:
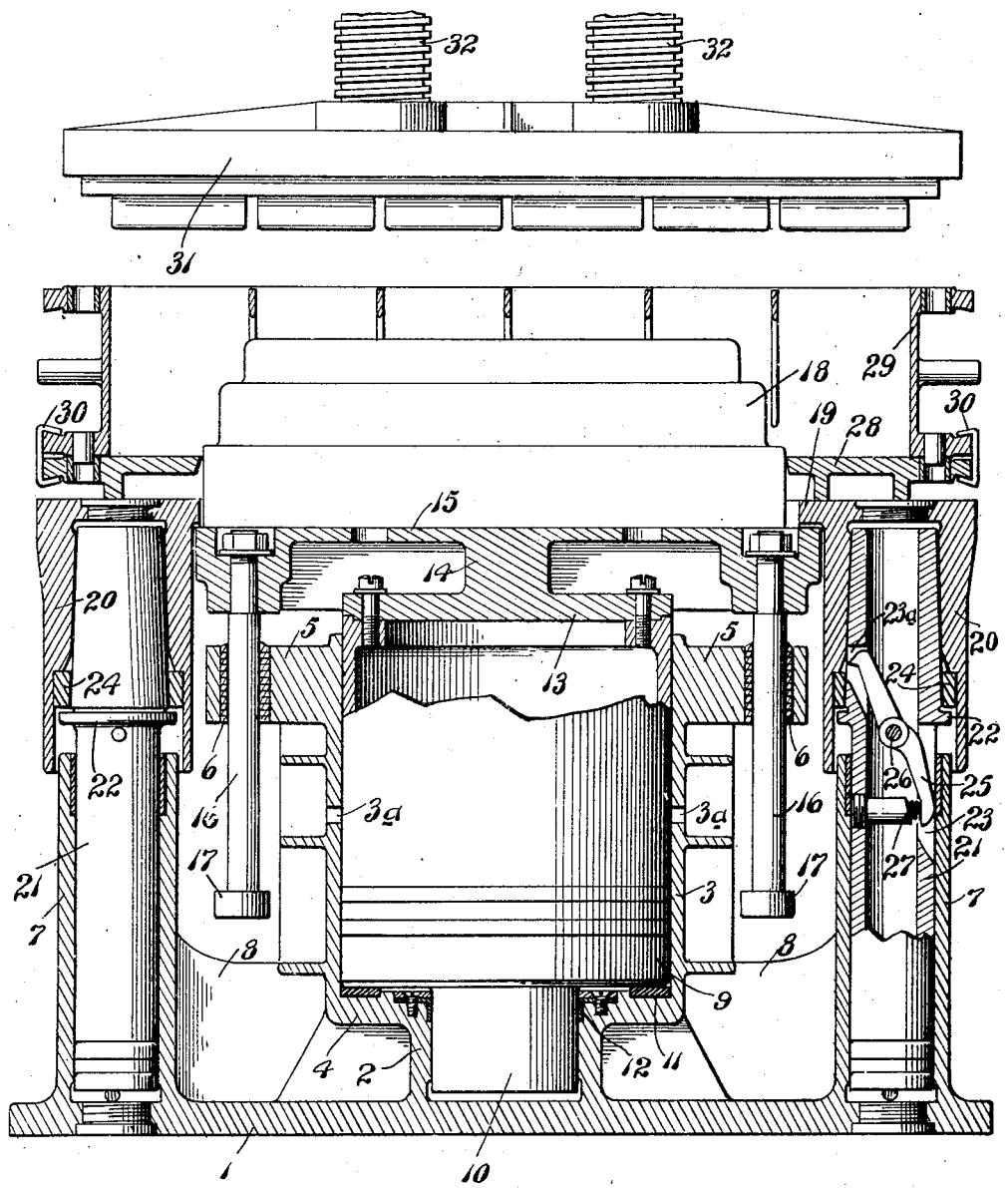
Fig. 9 is an enlarged vertical section through the molding apparatus taken in a plane at right angles to the section shown in Fig. 6, showing the mechanism in lower position.
Figure 10:
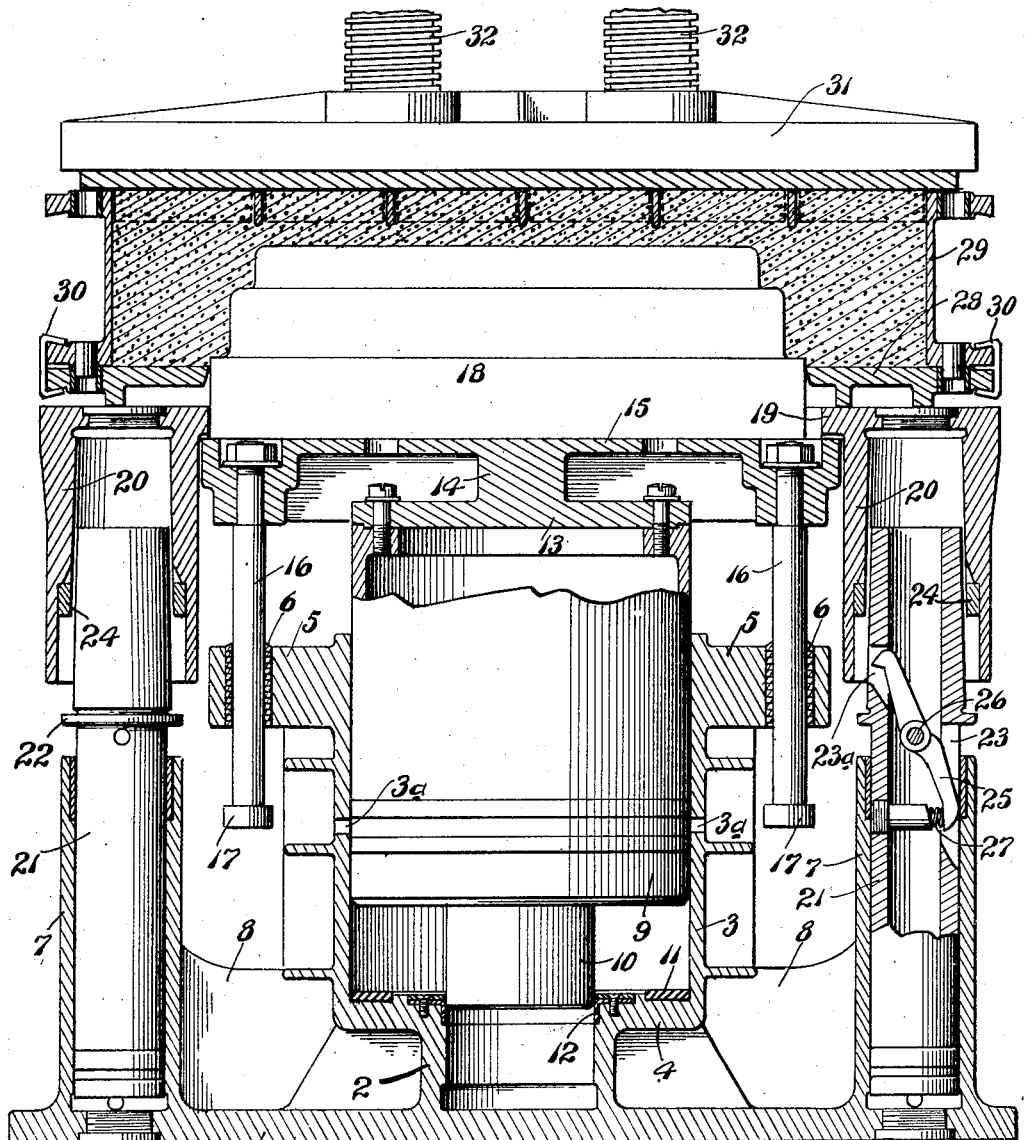
Fig. 10 is a view similar to that shown in Fig. 9 illustrating the position of the parts during the squeezing operation.
Figure 11:
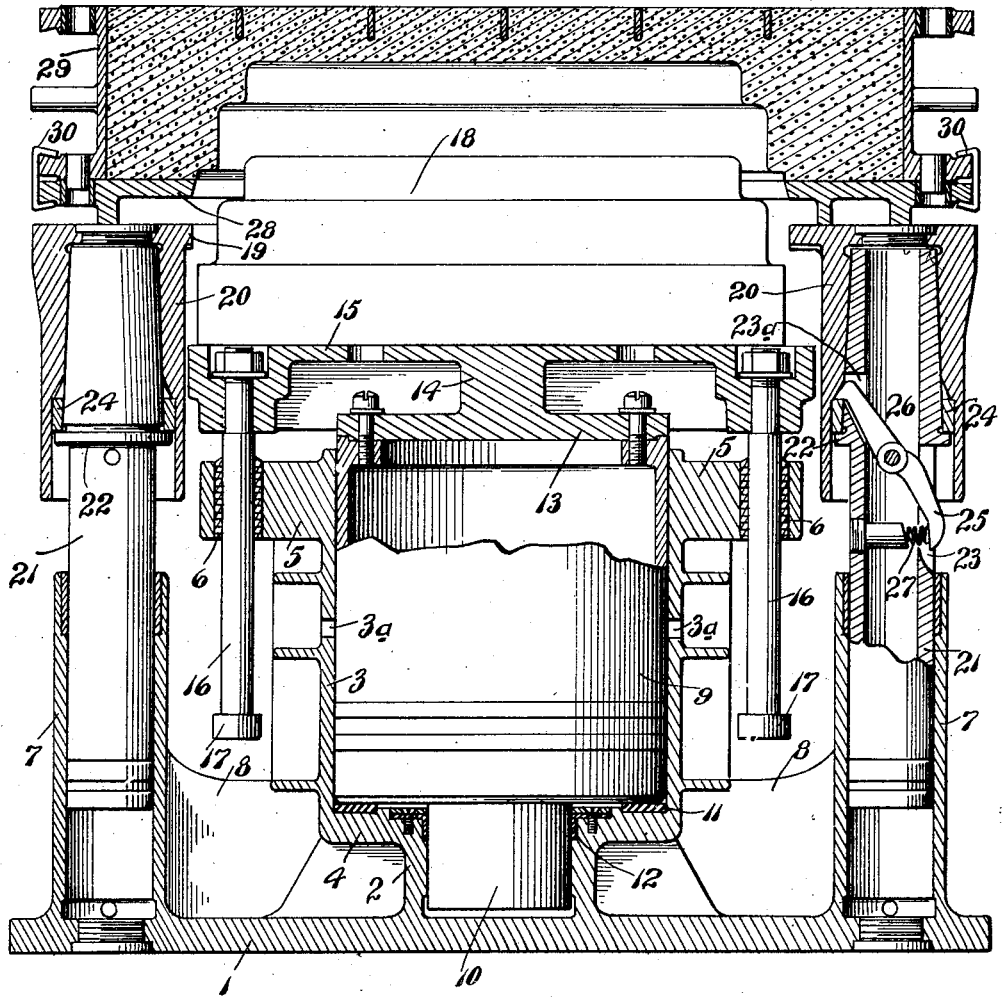
Fig. 11 is a view similar to Figs. 9 and 10 illustrating the parts of the mechanism in a different position or that which they take when the mold is elevated above and away from the pattern.

The upper end of the piston 9 is closed by a head 13 from which a short integral post 14 extends upwardly with which a table 15 is cast, the same extending outward beyond the limits of the head 13. Two rods 16 are connected to and depend from the table 15 passing through the bushing 6, and at their lower ends are equipped with heads 17 larger in diameter than the openings through the bushings. The table 15 is designed to carry a pattern 18 around which the mold is to be made. Above the table 15 a second table 19 is located having an opening therein which freely passes the pattern, portions of the table 19 extending over the table 15 so that on elevation of said table 15 the table 19 is moved therewith. Said table 19 at opposite ends thereof is formed with downwardly extending sleeves 20, each of which passes over the upper end of a hollow piston 21 the lower end of which is received in the adjacent cylinder 7 directly beneath the sleeve 20. Said pistons 21 a short distance above the upper ends of the cylinders 7 are formed with an annular outwardly extending flange 22 and each in one side thereof is provided with a vertical slot 23 cut through to the inner space within the cylinder, while in the opposite side at a higher level a second slot 23ᵃ is cut, as shown in Figs. 9, 10 and 11. A collar 24 is fixed within each sleeve 20 around the upper end of each piston 21 a short distance above the flange 22. A lever 25 is pivotally mounted between its ends on a pin 26 extending across each hollow piston 21, the lower end of the lever being received within the slot 23 and normally bearing against the inner side of the piston 21, being pressed thereagainst by a spring 27 as shown. The upper end of each lever 25 is provided with a hook or dog which, on elevation of the pistons 21 in the cylinders 7 a distance sufficient that the lower ends of the levers 25 pass above the upper ends of the cylinders, will be received in a recess cut on the inside of the sleeve 20 above the collar 24. While the levers 25 at their lower ends are within the cylinders 7, however, the hooked upper ends of the levers 25 are held to inner position and do not engage with and above said collars 24.

A stripping plate 28 is located above the table 19, resting thereon. The stripping plate has an opening therethrough for the passage of the pattern and also serves as a support for the flask 29 which is located on the same around the pattern and is clamped thereto by the means of the usual clamps 30. With the parts in the position shown in Fig. 9 the flask is adapted to receive sand which may be placed therein in any desired manner.

A squeezing head 31 carried at the ends of two screws 32 is adapted at times to be brought directly over the flask and pattern. The screws 32 pass upwardly through the ends of arms 33 and may be adjusted to different positions and held in such positions by means of the nuts 34, one located above and the other below the end of each arm 33. The arms 33 at their inner ends are connected by a sleeve 35 and are mounted for pivotal movement on a pin 36 which passes horizontally through the arms and sleeve and at its ends has a bearing in the upper ends of the sides 37 of a casting provided for the support of the squeezing head. This casting in addition to the sides 37 includes a base 38 and a partial vertical side 39 which lies against the cylinder casting previously described, as best shown in Fig. 2.

Each of the arms 33 is formed with a rearwardly extending wing or vane 40 which in effect forms the second arm of a bell crank lever. These vanes are provided with enlarged bearings 41 at their ends. A link 42 at one end passes between the bearings 41 and a pivot pin 43 passes through said bearings and end of the link. The opposite end of the link 42 is pivotally connected at 44 with one end of a member 45 which at its opposite end is pivotally mounted on a pin 46 extending between the sides 37 of the squeezing head support. An air cylinder 47 is positioned substantially vertically below the member 45 and is mounted for swinging movement at its lower end on a pivot pin 48 carried by the base 48 of the support. Within this cylinder a piston 49 is located, a piston rod 50 extending therefrom and passing through the upper end of the cylinder and having pivotal connection to the member 45 between its ends. Air carrying pipes 52 and 53 lead to the upper and lower ends of the cylinder 47 above and below the piston 49, respectively. It is evident that on introducing compressed air into the cylinder through the lower pipe 53, piston 49 is elevated, thereby turning the squeezing head from the position shown in Fig. 3 to that shown in Fig. 2 while on reversal of this operation or introducing compressed air through the pipe 52 into the cylinder above the piston 49 the squeezing head is moved back from the position shown in Fig. 2 to that shown in Fig. 3. The movement of the squeezing head from inoperative to operative position is stopped by the engagement of the head 54 of a bolt carried on an arm 55 projecting from the sleeve 35, striking against an abutment made by the part 56, shown in Fig. 3, which is fixedly connected with the side 37 of the support. This stopping at a desired position is also effected by the engagement of the cross bar 45ᵃ of the member 45 with the link 42, as shown in Fig. 2.

At the front side of the molding apparatus and near its lower end the bottom 4 of the lower end of the cylinder 3 is thickened and made integral with the base 1, as indicated at 4ᵃ in Fig. 13, the space being completely filled at this point. A valve carrying member 57 is located against the part 4ᵃ at its front side and bolted thereto, it being formed with an inwardly extending cylindrical projection 58 which extends partly into a cylindrical opening bored into the part 4ᵃ (see Figs. 12 and 13). This projection 58 is formed with a cylindrical opening therethrough and to the outside of the valve carrying member 57 in which a cylinder 59 is mounted, the outer end thereof being reduced in size as indicated at 60 and at its extreme outer end squared for the ready attachment of a wrench, and a packing gland 61 passes over the reduced portion 60 and is screwed into the cylindrical opening in the member 57, suitable packing being disposed between the cylinder 59 and the gland. At its inner end the cylinder 59 is enlarged in diameter to make a head 62 which fits the cylindrical boring beyond the projection 58. An annular groove 63 is made around the head 62 between its ends and nearer the outer than the inner end thereof. Likewise an annular groove 64 is cut in the casting 57 around the outer end portion of the cylinder 59. Cylinder 59 is bored from its inner end nearly to the reduced section 60 making a central longitudinal opening or passage 65 therethrough. Holes 66 are made through the cylinder 59 to said central opening 65, said holes being in the plane of the annular recess 64 previously described. The inner end of the passage or opening 65 is closed by a plug 67 and a single opening 68 is made through the cylinder 58 at a point such that communication may be had between the passage 65 and the annular groove or recess 63. A single horizontal opening 69 is bored through the head 62 from its inner end to the groove 63 and a plurality of openings 70 of the same diameter as the opening 69 are made through the part 4ᵃ at the inner end of the cylindrical recess in which the projection 58 and the head 62 are received. It is evident that by turning the cylinder 59 to different positions the opening 69 may be made to register with any one of the openings 70, which openings 70 are in different vertical planes. The purpose of this will later appear. When once adjusted to a desired position the cylinder 59 is held in such position by a set screw, as shown in Fig. 12.

At one side of the cylinder 59 and mounted in the valve carrying member 57 is a tapered valve 71 having a horizontal passage 72 diametrically therethrough in its upper portion which, when the valve is turned to one position, aligns with an exhaust opening 73 made in the member 57 and a continuation of said exhaust opening at the opposite side of the valve, indicated at 74, in alignment therewith which joins with a passage 75 bored a distance into the part 4ᵃ and thence turned upwardly, as indicated at 75ᵃ, making communication with the lower end of the larger cylinder 3, whereby when the valve 71 is in the position shown in Fig. 13, the air will have free passage from below the larger piston 9 to the outside. A passage 76 is made from the annular groove or recess 64 to the valve so that when the valve is turned to a position at right angles to that shown in Fig. 13 there is a free communication between the lower end of the larger cylinder 3 and said recess 64. A second passage 77 is interposed between the lower portion of the valve and the annular recess 64 (see Fig. 16) the passages 76 and 77 being separated by a horizontal partition 78. In the lower portion of the valve 71 an opening 79 of the form shown in Fig. 14 is made such that when the valve is properly positioned, as shown in Fig. 14, there is free communication through the valve between the recess 64 and a communicating opening 80 made in the casing 57 which passage 80 is turned downwardly as indicated at 80ª and communicates with another portion or chamber in the valve casing which will later be described.

A stem 81 extends downwardly from valve 71 and adjacent its lower end carries a disk 82, between which and the lower end of the valve a coiled spring 83 under pressure is located holding the valve tightly in place. At the lower end of the stem 81 an arm 84 is attached to which a connecting rod, as will later appear, is connected for operation of the valve to turn the same to different positions.

Figure 16:
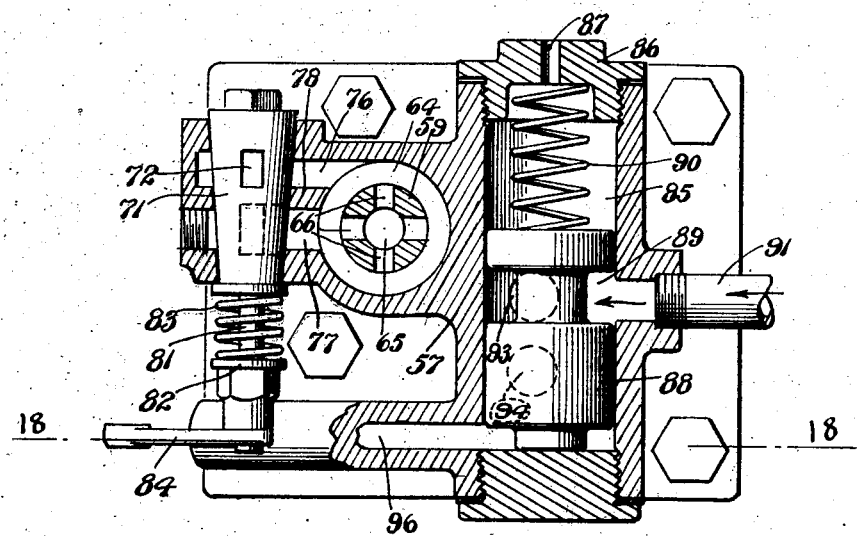
Fig. 16 is an enlarged vertical section through the valve mechanisms shown in Fig. 13.
Figure 17:
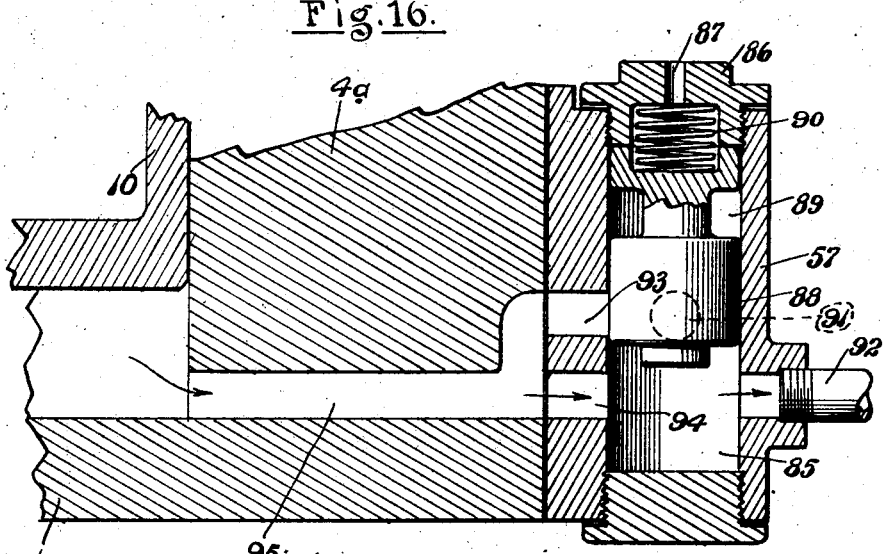
Fig. 17 is a fragmentary vertical section taken substantially on the plane of line 17—17 of Fig. 13.
Figure 18:
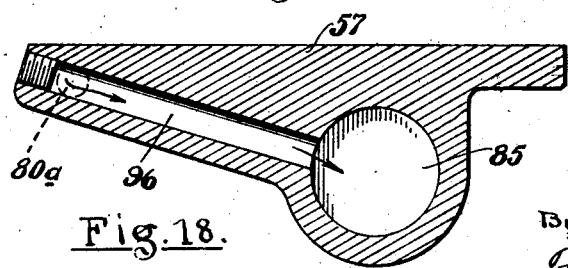
Fig. 18 is a horizontal section on the line 18—18 of Fig. 16.

At the opposite side of the cylindrical member 59 in the valve casing member 57 a vertical cylindrical opening 85 is made, closed at its lower end by a solid screw plug and at its upper end by a screw plug 86 which has a central vent opening 87 therethrough. Within the cylindrical opening 85 a cylindrical valve 88 is mounted, the same adjacent its upper end being formed with an annular groove 89 around it. The valve 88 is normally held in lower position against the lower plug by means of a relatively light coiled spring 90 which is interposed between the upper end of the valve and the upper plug 86. In the lower position of the valve, as shown in Fig. 16, the groove 89 therein aligns with a pipe 91 entered into a side of the valve casing 57 which is adapted to carry compressed air, it being evident that the air passes freely into and fills the groove. While in the upper position of the valve an outlet pipe 92 for the exhaust of air is uncovered, the same being completely closed when the valve is in lower position. Tow ports 93 and 94, the former being located above the latter and the latter being in direct alignment with an elongated passage 95 in the part 4ª leading to the lower end of the cylinder 2 and both communicating with said passage 95, are made in the valve casing member 57 in the side thereof directly opposite the exhaust pipe 92. When the valve is in lower position the port 93 is in conjunction with the annular groove 89 in the valve, it being evident that air passing inwardly from the pipe 91 into such annular groove or recess passes thence through the port 93 which is connected with the passage 95 and compressed air is carried to and below the downwardly projecting small piston 10 at the lower end of the larger piston 3; and that when the valve is in upper position as shown in Fig. 17 air beneath said smaller piston 10 may pass freely outward through the passage 95 and port 94 to the exhaust pipe 92. From the lower end of the cylindrical opening 85 a passage 96 is made in the valve housing 57, it being in communication with the downwardly extending branch 80ª of the passage 80 previously described as being at times in communication with the passage 79 through valve 71, as shown in Fig. 14.

At the front of the apparatus and toward one side thereof the manual control mechanism of the apparatus is located. In its construction a vertical supporting post 97 is used, at the upper end of which a valve housing or casing 98 is permanently secured, into the rear side of which a pipe 99 leads. The pipe 99 is connected with any suitable tank or other source of compressed air. The casing or housing 98 has passages 100, 101 and 102 therein for the conduction of the compressed air. The two passages 100 and 101 lead in opposite directions and each extends to the end of the casing terminating in outlet or exhaust openings 100ª and 101ª, while the passage 102, disposed at right angles to the passages 100 and 101, extends to the front side of the casing and terminates in an exhaust outlet 102ª.

Figure 19:
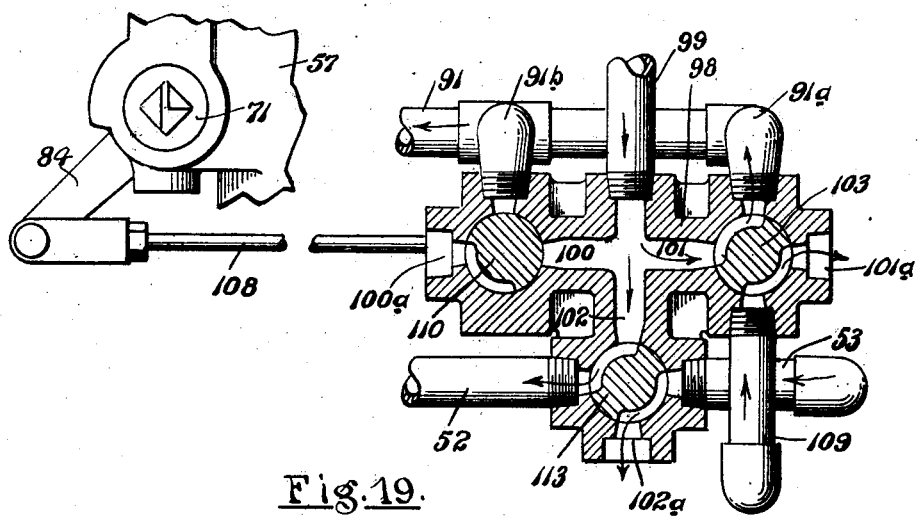
Fig. 19 is a horizontal section through the control valve assembly manually operable so as to direct compressed air, and showing the valves in the position that they occupy for the jolting operation.
Figure 21:
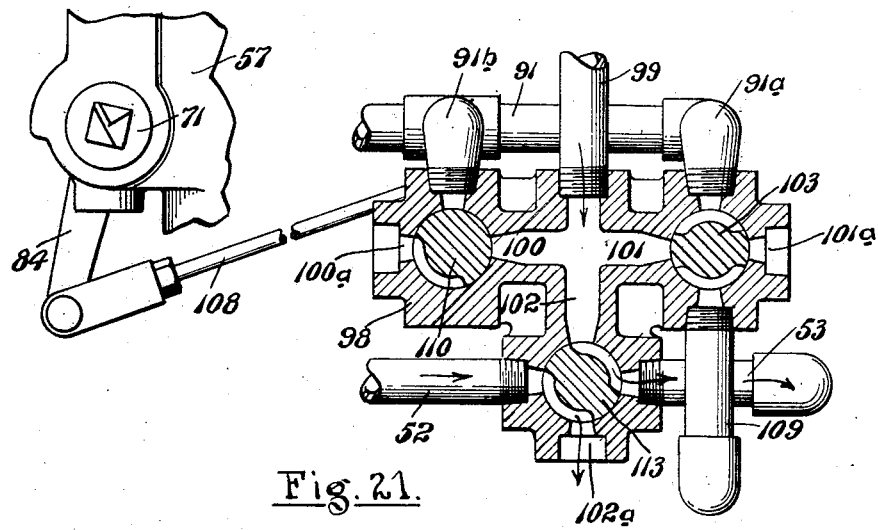
Fig. 21 is a view similar to Fig. 19 indicating the position of the valves when the squeezing head is turned to operative position.
Figures 22, 23:
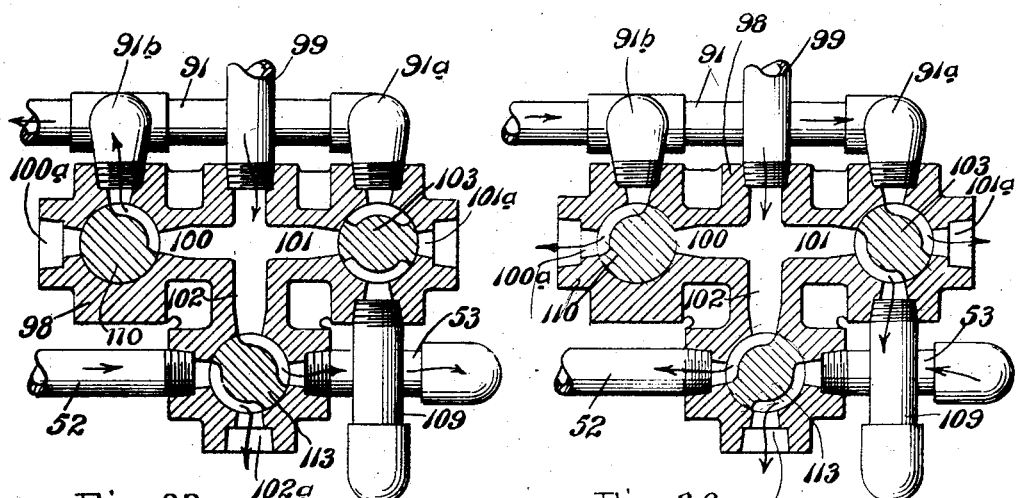
Fig. 22 is a view similar to Fig. 21 showing the position of the valves during the squeezing operation.
Fig. 23 is a view similar to Figs. 21 and 22, the valves being in the position to which they are moved for the pattern drawing operation.

A valve 103 is rotatably mounted in the passage 101, being positioned vertically and at its upper end equipped with a handle 104 for manually turning to different positions. A pipe 91ª leads from the rear side of the casing 98 and connects with the air pipe 91 previously described. In one position of the valve 103, as shown in Fig. 19, there is a free passage of compressed air from the pipe 99 through the passage 101 to said pipe 91 through the connecting pipe 91ª. In another position of the valve, shown in Fig. 23, there is a free outward passage of the air through the pipe 91 and its connecting pipe 91ª and through the exhaust outlet 101ª. In other positions of the valve, as shown in Figs. 21 and 22, there is no passage of air by said valve 103.

The valve 103 is equipped with a lower rod extension 105 which extends below the casing 98 and is held tightly in place by a spring 106 in the same manner that valve 71 is maintained in tight engagement. At the lower end of the rod 105 an arm 107 is secured between which and the arm 84 on the stem 81 of valve 71 a connecting rod 108 is interposed, whereby on manual operation of the handle 104 to turn valve 103 the valve 71 is also turned.

At the front of the casing 98 directly opposite the point of attachment of the pipe 91ª, a pipe 109 is connected, the same leading downwardly and thence to one side to the mechanism which, as will be later described, controls the operation of drawing the mold from the pattern. It is evident from an examination of Figs. 19 and 23 that on turning the valve 103 to the position shown in Fig. 19 there is an exhaust of air outward through the exhaust outlet 101ª, and when in the other position shown in Fig. 23 there is free passage of air from the main supply pipe 99 to said pipe 109.

In the passage 100 a valve 110 is located constructed similar to the valve 103 except that in one side only is a groove made for the passage of air. A pipe 91ᵇ connects the pipe 91 with the casing 98 so as to be associated with the valve 110, whereby when said valve is turned to the position shown in Fig. 22 air from the main air supply pipe 99 is carried through the connecting pipe 91ᵇ to the pipe 91. In the positions shown in Figs. 19 and 21 this valve is inoperative to produce any result except close the end of the passage 100, while in the position shown in Fig. 23 the passage 100 is closed and a passage made for the exhaust of air from the pipe 91 through the exhaust outlet at 100ª. This valve is manually operable by a handle 111 located above the casing 98 and is likewise held in place by a spring 112 (see Fig. 20).

Figure 20:
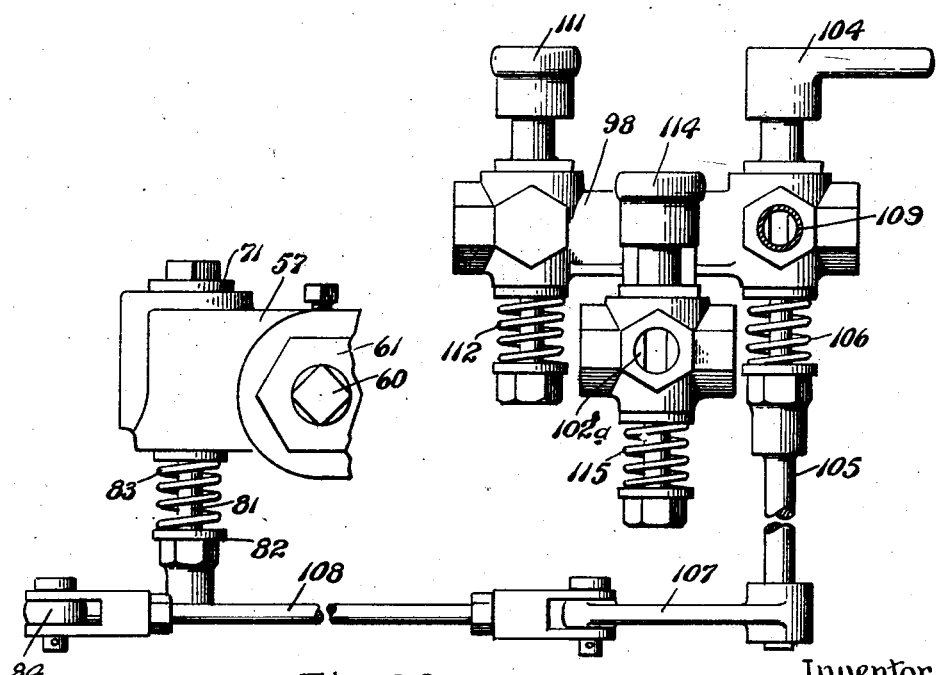
Fig. 20 is an enlarged front elevation of the control valve assembly.

In the passage 102 a like valve 113 is rotatably mounted adapted to be operated by a handle 114 and held in position by a spring 115 (see Fig. 20). The pipes 52 and 53 which are associated with the cylinder 47 for moving the squeezing head to operative and inoperative position lead to the casing 98 at opposite sides, the valve 113 being interposed between them. This valve, by movement to different positions, may direct the air to one of the pipes 52 with an exhaust outward through the pipe 53, or may reverse this direction of air so as to pass to the pipe 53 with an exhaust outward from the pipe 52. In Figs. 21 and 22 the air is shown as passing into the pipe 53 and exhausting outward from pipe 52, while in Figs. 19 and 23 the opposite takes place.

On the base 38 of the support for the squeezing head a closed housing is located comprising an upper portion 116 with a bottom closure plate 117. The pipe 109, previously described, leads to the upper end of this housing and when air is directed into said pipe 109 it is carried into the housing and above a piston 118 mounted therein. This piston has a piston rod 119 which extends upwardly through a stuffing-box fixture 120, being equipped with nuts 121 at its upper end which may be adjusted to different positions on the rod. In practice these nuts and the projecting end of the rod are covered by a metal cap 122. Below the piston 118 the casing is filled with oil and a strong coiled spring 120 is interposed between the lower side of the piston and the bottom 117 of the housing, the tendency of which is to force the piston upwardly. An outlet 124 leads from the bottom 117 of the housing with which two branch pipes 125 are connected, one leading to the lower end of each of the cylinders 7. It is clear that on the passage of compressed air into the housing above the piston 118 and the downward movement of the piston caused thereby, the oil is forced out of the housing through pipes 125 into the cylinders 7 and below the elongated pistons 21 therein, elevating said pistons and the table 19 carried at their upper ends with a consequent elevation of the stripping plate 28 and the flask and the mold within the flask, and when the air is permitted to escape from this housing spring 123 acting to elevate the piston 118 combined with the weight of the table 19 and the pistons 21 forces the oil back into the housing. The height to which the table 19, stripping plate 28 and flask will be elevated is governed by the position of the nuts 121 on the rod 119 as the piston 118 can be moved downwardly only the extent permitted by the nuts when they engage against the fitting 120.

Operation: With the parts of the machine in the position shown in Fig. 9, but with the squeezing head turned back to inoperative position, sand may be placed in the flask 29 in any desired manner, it being evident, as shown in Fig. 1, that the table 19 is formed with downwardly extending sides 19ª which serve to protect the cylinders and pistons from sand entrance. When the flask has been filled with sand or during its filling it is subjected to a jolting operation. In such operation the valve 110 is in inoperative position, the valve 103 is turned so as to direct the compressed air through passage 101 and into the pipe 91 through the pipe connection 91ª, while valve 113 is turned so that compressed air is directed into the cylinder 47 through the upper pipe 52 moving the squeezing head back and holding it in inoperative position, the air in the cylinder below the piston 49 being forced outwardly through the pipe 53 and past the valve 113, the position of the valves being that shown in Fig. 19.

The air passing through the pipe 91 enters in the annular recess 89 around the valve 88 (see Fig. 16) and thence through the port 93 to the passage 95 and under the smaller piston 10, elevating this piston and the attached piston 3 and causing the tables and flask to be elevated. When the valve 103 is turned to the position shown in Fig. 19 valve 71 is also turned to the position shown in Fig. 13, whereby there is a free passage to the larger cylinder 3 underneath the larger piston 9 from the outside. At the same time the passage 79 in the valve 71 is turned to the position shown in Fig. 14 making a free communication between the passage 65 in the member 59 and the lower part of the chamber 85 below the valve 88. The pistons 3 and 9 are elevated until the passage 70 is uncovered, whereupon the compressed air passes through the passages 70 and 69, the opening 68, the passage 65, the opening 66, into the annular groove 64, whence it is carried through the passage 77, the opening 79 through the valve 71 and the passage 80 and 96 to below the cylindrical valve 88, thereby forcing the same upward against the spring 90, closing the port 93, opening port 94 and closing the end of the air supply pipe 91, whereupon the air within the smaller cylinder 2 passes freely outward through the passage 95, port 94 and exhaust pipe 92. The pistons or rams 9 and 3 follow by gravity when this occurs and air which is underneath the larger piston 9 passes outwardly through the passages 75, 74, 72 and 73, as shown in Fig. 13. The piston 9 drops until it strikes against the hardened ring 11 thereby jarring or jolting the mechanism and causing the sand to condense in the mold.

The valve at 88 moves downwardly by gravity and under the force of the spring 90 as the air pressure under said valve decreases with the escape of the compressed air through the exhaust pipe 92, and as soon as it reaches its lower position again uncovering the port 93 and the entrance for compressed air through the pipe 91, the operation will be repeated. Accordingly, with the valves in the position shown in Fig. 19 the cylinders 9 and 10 are elevated and then dropped repeatedly and a successive series of jolts given to the flask which has the effect of condensing the sand in the flask, particularly at the lower portion thereof. It is evident that the extent of the elevation of the pistons and attached parts is governed by the position of the passage 69 in the head 62 relative to the particular port opening 70 with which it is in alignment. That is, the pistons 9 and 10 are elevated a greater or less extent dependent upon the height that the port opening 69 has, and this can be changed and adjusted by turning the member 59 to different positions to bring the passage 69 in alignment with the several openings 70 which are at varying heights.

The jolting of the sand in the flask may be carried to any desired degree and after it has been sufficiently jolted and condensed the next operation is to move the squeezing head to position over the flask. This is accomplished by turning the valves to the position shown in Fig. 21, that is, the valve 103 is turned to inoperative position simultaneously turning the valve 71 with it so as to render the passage 79 ineffective and join passage 72 with the passages 76 and 74. Valve 110 remains unchanged but valve 113 is moved so as to reverse the flow of the compressed air from the upper pipe 52 to the lower pipe 53 leading to the cylinder 47. When this occurs the air passing through the lower pipe 53 forces piston 49 upwardly and the air above the piston passes outwardly through the pipe 52. The squeezing head is thence moved from its inoperative position shown in Fig. 3 to its squeezing operative position shown in Fig. 2.

The following step of operation consists in an elevation of the flask so as to bring the sand therein against the squeezing head 31. This is effected by turning the valve 110 from its inoperative position, shown in Fig. 21, to the position shown in Fig. 22, the squeezing head being held by the force of compressed air in operative position while the compressed air from the pipe 99 passes by the valve 110 through the pipe 91 and thence through the annular groove 89 in valve 88, and port 93, passage 95 to underneath the piston 10. This causes an elevation of the pistons, tables and flask so as to squeeze the sand in the upper portion of the flask against the under side of the squeezing head 31, as shown in Fig. 10. During the first portion of the operation of the pistons the elevation of the cylinders is effected only by the compressed air entering under the lower end of the piston 10 but after the opening 70, in alignment with the pipe 69, is uncovered the compressed air passes into the passage 65, thence through the opening 66 into the annular groove 64, thence through the passage 76, and the passage 72, in valve 71, to the passage 74, being carried therefrom through the passages 75 and 75ᵃ to the larger cylinder below the larger piston 9. It is evident that the valve 71 has been turned so that the passage 72 aligns with the passage 76 permitting the air to pass through the passage 75. After the squeezing operation has been effected and the sand squeezed to the proper density the valve 110 is turned to the position shown in Fig. 23 and the air escapes from the cylinders by a reverse movement of the air through the passages described, that is, until the opening 70 is again covered by the smaller piston 10 after which what air remains below the pistons is trapped against escape, making an air cushion for the mechanism and insuring against any abrupt dropping or jolting of the larger piston 9 against the hardened ring 11, which jolting might have the effect of injuring the completed mold which has just been completed by the squeezing process.

After the squeezing process has been completed and valve 110 has been turned to the position shown in Fig. 23 to permit the lowering of the pistons and attached parts, the valve 113 is changed in position so as to reverse the flow of air through the pipes 52 and 53 and move the squeezing head to inoperative position. Also the valve 113 is given a further quarter turn from the positions shown in Figs. 21 and 22 thereby directing the compressed air through the pipe 109 to the housing 116. This causes the piston 118 to be forced downwardly until stopped by the nuts 121, striking against the fixture 120, the oil within the housing being forced outwardly through the two branch pipes 125 to the lower end of cylinders 7 below the pistons 21 which are elevated, as shown in Fig. 11. With this elevation the table 19 and stripping plate 28 with the flask and mold above the stripping plate are elevated, the pattern remaining in lower position thereby effecting a drawing of the pattern from the mold which, with its flask, may be removed from the stripping plate and replaced by a new flask. The valve 103 may then be turned to the position shown in Fig. 19 allowing the compressed air to exhaust outwardly through the pipe 109 with a return of the parts to lower position. The latch levers 25 when their lower ends have passed above the upper ends of the cylinders 7 engage at their upper ends with the rings 24 against which the flanges 22 on the pistons 21 bear during the pattern drawing operation and on the return of the parts to lower position, the same return together, the levers 25 being disengaged when their lower ends enter the upper ends of the cylinders 7. The cycle of operations may now be repeated for a new mold starting again with the jolting and it is evident that the air which has been trapped below the cylinders has no detrimental effect with respect to the first jolting operation. In fact it has the beneficial effect of not requiring as much air for the elevation in the first jolting operation.

With this construction molds may be made, jolted and compressed to proper density and drawn from the patterns entirely through pneumatic agencies, the only other labor necessary being that of putting the sand into the flask. The jolting may occur during the time that the flask is being filled with sand for the purpose of saving time in constructing molds. It is evident that the air required for the jolting operation is kept down to a minimum by reason of the fact that the air used enters only under the end of the smaller piston 10 in the smaller cylinder 2 which keeps the volume of air used much lower than if it had to be entered underneath the whole area of the larger piston in addition. The elevation of the stripping plate and flask when the pattern is drawn is governed by the position of the nuts 121 on the rod 119 and insurance is also made against too far upward movement by the heads 17 on the rods 16 which permit such upward movement only until said heads come in engagement with the lower sides of the lugs 5. Furthermore the elevation of the piston 9 to a point above the openings 3ª cannot take place, such openings dissipating the pressure of the air below the piston when they are uncovered.

Figure 25:
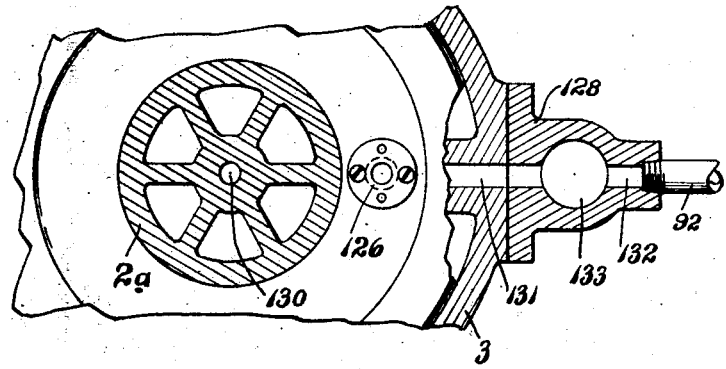
Fig. 25 is a fragmentary horizontal section on the plane of line 25—25 of Fig. 24.
Figure 24:
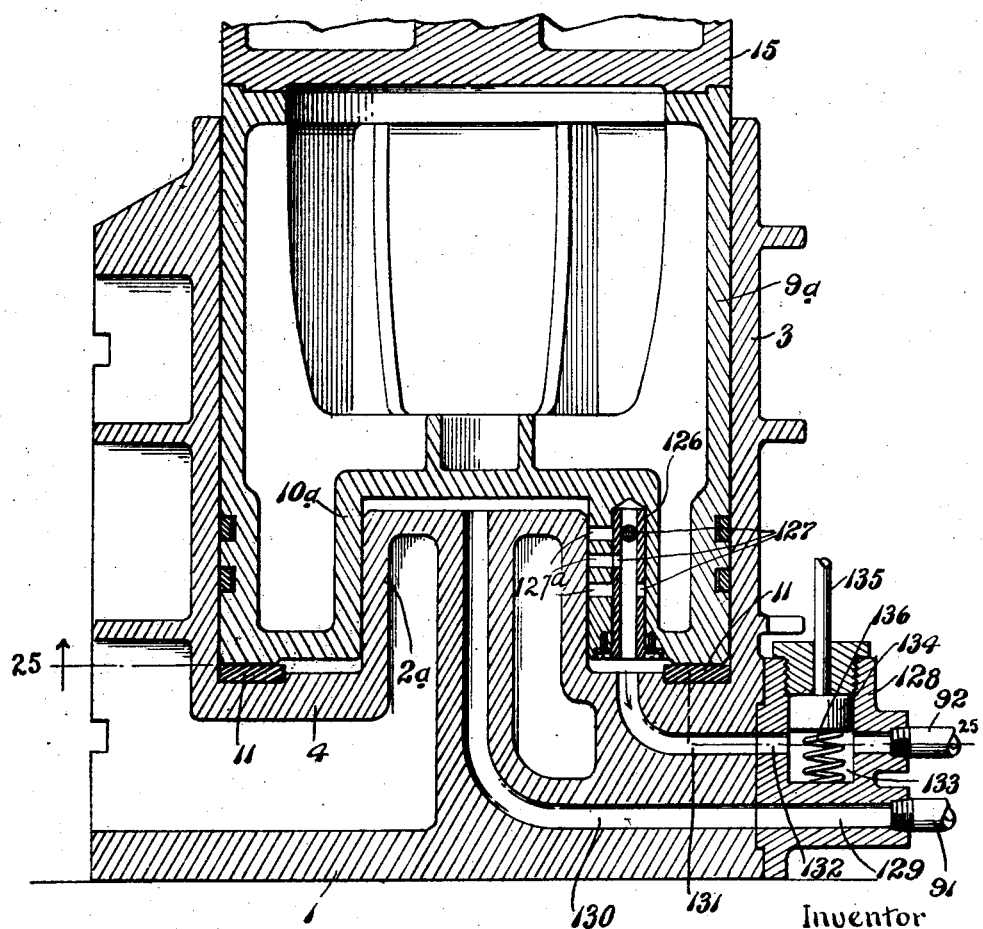
Fig. 24 is a fragmentary vertical section showing a modified form of construction embodying the invention.

The invention is capable of embodiment in a variety of forms and it is not desired that the same be restricted to the one form previously described. For instance, in Figs. 24 and 25 a modified form of structure is shown. In this construction instead of the small cylinder 2 and the downward projection 10 to the piston 9, the piston 9ª is formed with an upwardly extending cylindrical member 10ª at its lower end which fits over a cylindrical projection 2ª cast integral with the base 1 and the bottom 4 of the main cylinder 3. In a wall of the part 10ª a tubular valve 126 is mounted in vertical position, the same having three holes 127 in its sides at different positions in the height thereof which are adapted, when the valve is turned to proper position, to come into alignment with the three passages 127ª made from the valve to the inner side of the part 10ª. The tubular valve in this way may be used to exhaust the air through any one of the passages 127ª which is in conjunction with an opening 127, this controlling the height to which the cylinder 9ª rises during the bumping operation. A casing 128 is fixed to the lower end of the cylinder 3 through the lower portion of which a horizontal passage 129 is made, the same joining with a passage 130 made through the base 1 and the projection 2ª to the upper end thereof. Air is carried into said passages through the pipe 91. There is a second passage 131 leading to below the main piston 9ª and preferably in alignment with the opening in the tubular valve 126 at its lower end. The outer end of the passage 131 aligns with the passages 132 through the casing 128 into the outer end of which the pipe 92 is secured. A relatively large cylindrical opening is bored into the upper end of the casing 128 across the passage 132 and is closed at its upper end by a plug, a piston 134 being mounted in the opening 133 from which a rod 135 extends upwardly through the plug. The piston is normally held in upper position by a coiled spring 136.

When the air is carried through the pipe 91 to the cylindrical portion 10ª, cylinder 9ª is lifted until the passage 127ª which joins with the opening 127 in the valve 126 is uncovered, whereupon the air escapes therethrough permitting cylinder 9ª to fall and jolt the flask carried thereon. By moving the piston 134 downwardly across the passage 132 this air cannot escape and the cylinder 9ª can be lifted to squeezing position. Then by releasing the piston 134 to return to upper position the piston will move back to lower position and the stripping operation be performed, it being understood that the stripping plate 19 has been previously elevated and is held against downward return as before described.

This construction of simpler form takes the place of the more complicated structure shown in Fig. 13 for controlling the passage of air to the cylinder but is an equivalent of the same for the production of the same results.

The construction described is complete and practically operative for the purposes for which it is designed. The invention may be embodied in various other manners and the showing made is to be considered as illustrative of the invention and in no sense as limiting it to the particular and specific construction shown. The invention is defined in the appended claims and is to be considered as comprehensive of all forms of structure coming within their scope.

I claim:

1. In a molding machine, a cylinder, a piston therein, a table carried by the piston, said table adapted to carry a pattern, a second table supported by the first table, said second table adapted to carry a flask, a second cylinder and a piston in said second cylinder, said second piston being normally detached from the second table but adapted to engage and lift the same independently of the first table.

2. In a molding machine, a cylinder and a piston therein, a pattern table carried by said piston, a stripping table to support a flask, said stripping table being supported upon the pattern table, stripping cylinders with pistons therein, said first piston and stripping pistons being independently operative, and means to detachably connect the stripping pistons with the stripping table, said means being automatically disconnected when said pistons are in their lower positions.

3. In a molding machine, a cylinder and a piston therein, a pattern table carried by the piston, a stripping table to carry a flask, said stripping table being supported upon said pattern table, stripping cylinders with pistons therein, a tapered head on each stripping piston, tapered sockets on the stripping table to removably receive the said tapered heads, and means for independently actuating the first named piston and the stripping pistons.

4. In a molding machine, a cylinder and a piston therein, a pattern table carried by the piston, a stripping table to carry a flask, said stripping table being supported upon said pattern table, stripping cylinders with pistons therein, a tapered head on each stripping piston, tapered sockets on the stripping table to receive the said tapered heads, means for detachably holding said tapered heads in said tapered sockets, and means for independently actuating the first named piston and the stripping pistons.

5. In a molding machine, a stationary supporting fixture including a base, a relatively small and short cylinder extending vertically from the base and a larger and longer cylinder extending from and above the first cylinder, a piston located within the larger cylinder and having a cylindrical projection at its lower end adapted to enter the smaller cylinder, a table carried at the upper end of the larger piston, a pattern located on and above the table, a second table having an opening for the passage of the pattern bearing against the upper side of the first table, a flask carried by the second table around the pattern, means for alternately entering air into the smaller cylinder below said lower cylindrical extension to the piston and exhausting the air therefrom, whereby said cylinder is alternately elevated and dropped and sand within the flask around the pattern jolted and condensed, a squeezing head adapted to be located above the flask, and means for elevating the piston by directing compressed air into both cylinders thereby forcing the sand within the flask against the lower side of the squeezing head, substantially as described.

6. In a molding machine, a vertical relatively large cylinder having a centrally located downwardly extending smaller cylinder at the bottom thereof, a vertical piston located within the cylinder having a centrally located cylindrical projection extending from its lower end into said smaller cylinder, a table carried at the upper end of the piston, a pattern on the table, a flask around the pattern, a squeezing head adapted to be moved to a position directly over the flask, means for alternately entering and exhausting air into and out of the smaller cylinder below the lower smaller cylindrical projection extending from the piston, thereby alternately elevating and dropping the piston and the pattern and flask carried thereby and jolting and condensing the sand in the flask around the pattern, and means for carrying compressed air into both cylinders below the piston and said cylindrical projection to thereby elevate the flask and squeeze the sand therein against the under side of the squeezing head, substantially as described.

7. In a molding machine, a support, a flask and pattern carried on said support, said pattern being located within the flask and said flask being adapted to contain sand, a bell crank lever construction pivotally mounted on the support above and at one side of the flask, a squeezing head carried at one end of the bell crank lever, a cylinder, a piston within the cylinder, a rod extending from the piston, means connecting the rod with said bell crank lever construction for moving the squeezing head into position directly above the flask on movement of the piston in one direction and for moving said squeezing head away from the flask on movement in the opposite direction, and means for directing compressed air into said cylinder at either side of the piston, substantially as described.

8. A construction containing the elements in combination defined in claim 7 combined with means for elevating the flask and pattern for forcing sand within the pattern into squeezing contact with the squeezing head, substantially as described.

9. In a construction of the class described, a support, a pattern and flask around the pattern carried by the support, a bell crank lever construction pivotally mounted at one side of and above the flask, a squeezing head adjustably mounted on said bell crank lever construction at one end thereof, a substantially vertical cylinder pivotally connected at its lower end to the support, a piston within said cylinder, a rod extending from the piston, a link pivotally connected at one end to the opposite end of the bell crank lever construction, a member pivotally connected at one end to the support and at its opposite end to the opposite end of said link, said piston rod being pivotally connected at its upper end to said member between its ends, two pipes leading one into the upper and the other into the lower end of the cylinder, and a valve means associated with said pipes for selectively directing compressed air into either one of said pipes and opening a passage for exhaust of air through the other pipe.

10. In a molding machine, a support, a flask and a pattern within the flask carried by the support, said flask being adapted to receive sand, a bell crank lever construction pivotally mounted on the support above and to one side of the flask, a squeezing head carried at one end of the bell crank lever construction, a piston positioned vertically adjacent the lower portion and at one side of the support, means pivotally connecting the lower end of the cylinder to said support, a piston within the cylinder, a rod extending from the piston through the upper end of the cylinder, means interposed between said rod and bell crank lever construction whereby on upward movement of the piston the squeezing head is moved to position directly over the flask and on downward movement of the piston said squeezing head is moved away from the flask, means for selectively directing compressed air into either end of the cylinder above or below said piston, and means for elevating the pattern and flask so as to bring sand therein against the under side of the squeezing head, substantially as described.

11. In a construction of the class described, a support, a table carried at the upper end of the support, a pattern located on the table, a second table located normally against the upper side of the first table, said second table having an opening for passage of the pattern, a flask carried by the second table around the pattern and adapted to contain sand, two cylinders located one at either end of the second table and below the same, pistons associated with the second table extending downwardly into said cylinders, and means for pneumatically elevating said pistons, second table and flask whereby a mold formed in said flask over the pattern is elevated above and out of engagement with the pattern.

12. In a molding machine, a vertically positioned support, a table at the upper end of the support, a pattern carried on said table, a second table having an opening through which the pattern extends normally resting against the upper side of the first table, a flask carried on the second table around the pattern adapted to receive sand, two cylinders located at spaced apart points under said second table, pistons depending from the second table into said cylinders, a closed housing, pipes leading from the lower side of said housing one to the lower end of each of said cylinders, a third piston located in said housing beneath which and in said pipes and cylinders liquid is contained, and means for forcing said third piston downwardly to thereby force said liquid through said pipes into the lower end of the cylinders to elevate said pistons, second table and flask, substantially as described.

13. A construction containing the elements in combination defined in claim 16, combined with a piston rod extending upwardly from said piston within the housing and through the upper side of the housing, said rod being screw threaded at its upper end, and a nut adjustably mounted on said rod adapted on downward movement of said piston a predetermined distance to come into stop engagement with the upper side of said housing, whereby the downward movement of the piston is stopped, substantially as described.

14. In a construction of the class described, a vertical support, a table at the upper end of the support, a pattern carried on the table, a second table normally lying against the upper side of the first table having an opening through which the pattern extends, a flask on the second table around the pattern adapted to have a sand mold formed therein about said pattern, two vertical cylinders located at spaced apart points under said second table, two pistons extending from said second table into said cylinders, a cylindrical closed housing, a third piston mounted in said housing, pipes extending from the lower side of the housing, one to the lower end of each of said cylinders, said housing, pipes and cylinders below the pistons therein being filled with liquid, an air pipe leading into the upper side of said housing above its piston, and means for directing compressed air through said pipe into the housing, substantially as described.

15. A construction containing the elements in combination defined in claim 14 combined with a coiled spring located between the bottom of the housing and under side of said third piston within said housing, substantially as described.

16. A construction containing the elements in combination defined in claim 14 combined with a piston rod extending upwardly from said third piston through the upper side of the housing, a plug screwed into the upper side of the housing through which said rod passes, said rod being threaded at its upper end, a nut adjustably mounted on said threaded portion of the rod and a coiled spring disposed between the bottom of the housing and the under side of said third piston, substantially as and for the purposes described.

17. In a molding machine, a vertical cylinder, a piston located therein, a table at the upper end of the piston on which a pattern and molding flask may be supported, valve mechanism located at one side and at the lower end of the cylinder, a passage leading from said valve mechanism to the lower end of the cylinder, means for carrying compressed air to said valve mechanism and around the same to said passage, whereby the cylinder is elevated, passages leading from the cylinder at a higher level than said first passage and to said valve mechanism whereby the compressed air exhausts from the cylinder when the piston reaches said higher level, thereby operating the valve mechanism automatically to shut off the entrance of air to the cylinder, the operation of said valve opening the first mentioned passage to the outside to permit complete exhaust of the compressed air from below the piston, substantially as described.

18. In a molding machine, a vertical cylinder, a piston mounted therein, a valve casing located at the lower end and to one side of the cylinder, a vertical reciprocating valve mounted therein, there being a passage leading from the valve casing into the lower end of the cylinder below the piston, means normally holding said valve in a lower position, means for conducting compressed air to and around said valve and through the passage to said cylinder whereby the piston is elevated, an outlet passage located at a higher level and leading to a point below the valve whereby when the piston reaches said elevation compressed air is carried to below the valve thereby elevating the same, said elevation of the valve obstructing passage of compressed air to the cylinder and opening an outlet passage for air from the cylinder in alignment with the first named passage, whereby the piston drops by gravity, substantially as described.

19. In a molding machine, a vertical cylinder, a piston located therein adapted to be elevated by compressed air, a table at the upper end of the piston, a pattern and flask located over said table and movable therewith, said flask being adapted to contain sand, a squeezing head movably mounted and adapted to be moved to operative position directly over said flask, pneumatic means for moving the squeezing head to and out of operative position, pneumatic means for elevating the flask and mold therein above the pattern, means automatically operable when the piston has been elevated a predetermined amount to exhaust the air from beneath the same, and manually operable valve control means located at the front of the machine for first directing compressed air to the cylinder below the piston, then directing the compressed air to pneumatically operate the squeezing head to operative position, then directing compressed air to the cylinder to elevate the piston and the flask so as to compress the sand therein against the squeezing head, then directing the compressed air to move the squeezing head to inoperative position, and then directing the compressed air to elevate the flask with the mold therein above the pattern.

20. In a molding machine, a vertical cylinder, a piston mounted therein, a table at the upper end of the piston adapted to carry a pattern and having a flask located therearound, said flask receiving molding sand, a valve mechanism located at the lower end of the cylinder and to one side thereof, a passage leading from the valve mechanism to the lower end of the cylinder below the piston, a pipe for carrying compressed air leading to said valve mechanism, a manually operable valve associated with said pipe for directing compressed air from a source of compressed air through said pipe past said valve mechanism and through the passage to the cylinder, whereby the piston is elevated, a second passage leading from a higher elevation in said cylinder to said valve mechanism whereby when the cylinder attains a predetermined height the valve mechanism is automatically operated to close the air conducting pipe and open an exhaust outlet in alignment with the first mentioned passage, the air exhausting from the cylinder and the piston dropping by gravity, substantially as described.

21. In a construction of the class described, a vertical cylinder, a piston located therein, means for conducting compressed air into the cylinder below the piston whereby the piston is elevated, and automatic valve means operable when the piston has reached a predetermined height to obstruct the passage of compressed air to the cylinder and open an exhaust from said cylinder, whereby the compressed air is exhausted and the cylinder drops by gravity, said cylinder at its upper end being adapted to carry a flask and a pattern within the flask around which molding sand may be placed, substantially as described.

22. A construction containing the elements in combination defined in claim 20 combined with means manually adjustable to change the elevation to which said piston is moved before exhaust of air from the cylinder takes place, substantially as described.

23. In a molding machine, a vertical cylinder of relatively large diameter having a shorter cylinder of smaller diameter at its lower end, a piston located within the larger cylinder having a downwardly extending cylindrical projection entering into the smaller cylinder, said piston at its upper end being adapted to carry a pattern and a flask around the pattern in which molding sand may be placed, means for entering compressed air into the smaller cylinder below said projection extending from the piston, means automatically operable to exhaust the air from said smaller cylinder when the piston has been elevated a predetermined amount, and means for entering compressed air below both said cylinder and its downward projection whereby the pattern and flask may be elevated and the mold within the flask brought against a squeezing head, substantially as described.

In testimony whereof I affix my signature.

DONALD J. CAMPBELL.